Feb. 28, 1928. 1,660,730
W. W. STRYKER
REATOMIZER
Filed April 18, 1922
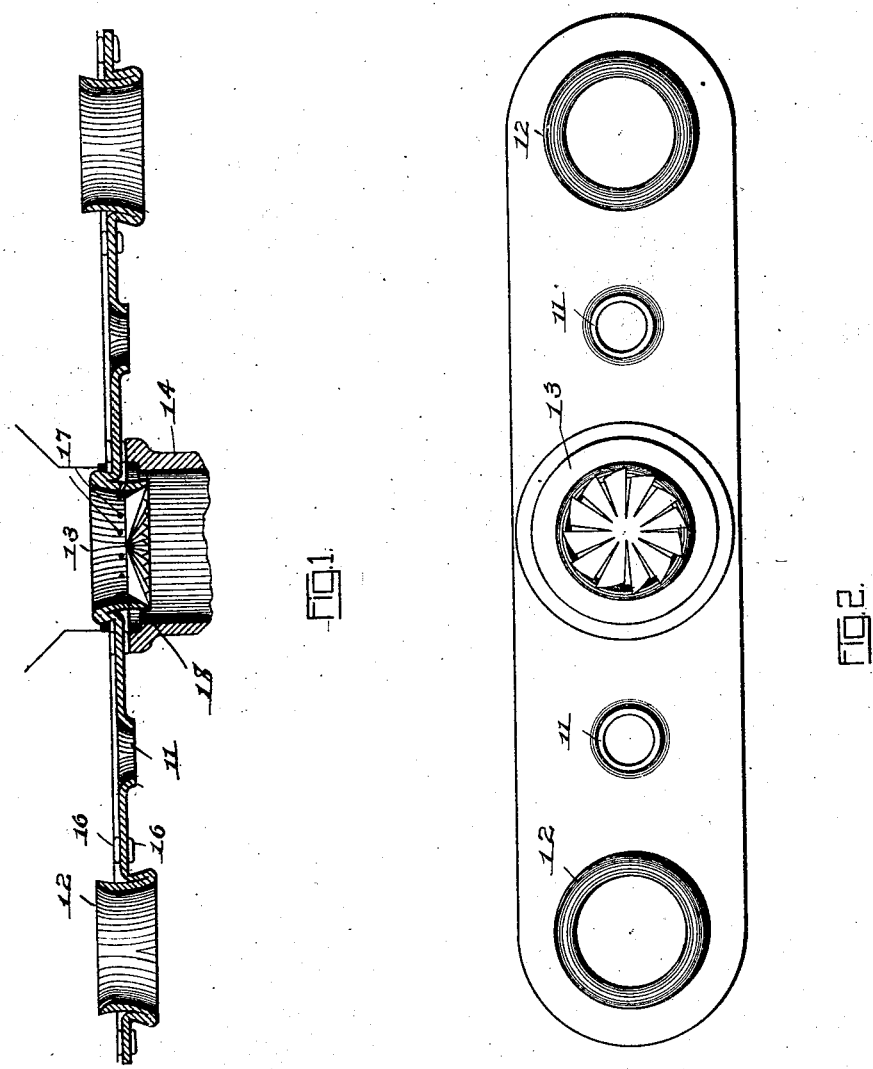

Patented Feb. 28, 1928.

1,660,730

UNITED STATES PATENT OFFICE.

WALTER W. STRYKER, DECEASED, LATE OF DAYTON, OHIO, BY EDWARD T. JONES, ADMINISTRATOR, OF DAYTON, OHIO.

REATOMIZER.

Application filed April 18, 1922. Serial No. 555,351.

This invention relates to charge forming devices for internal combustion engines and more particularly to that type of charge forming device in which the heat of the exhaust gas is utilized for heating the charge after the same leaves the carbureter and before it enters the explosion cylinders.

More particularly this invention contemplates a device as above set forth in which a strip or a plate of metal of high conductivity of heat, preferably copper, is so formed and arranged in connection with an internal combustion engine as to have portions of the plate in the path of the exhaust gases and other portions of the same positioned in the path of the charge as it passes from the intake manifold into the combustion cylinder whereby vaporization of the charge is increased.

A further object of the invention resides in the provision of a heat conducting plate of the kind described that provides a means for trapping the raw fuel which flows on the inner face of the wall of the intake manifold and vaporizes the same before allowing it to pass into the combustion cylinder.

In the drawing:—

Figure 1 is longitudinal section of the plate comprising this invention applied.

Figure 2 is a view in front elevation of the plate.

Referring to the parts by reference numerals, 10 designates, in its entirety, the strip of copper or other materal having a high conductivity of heat, the said strip having apertures 11 formed therein through which securing studs are adapted to pass. Venturii 12 are provided, the same being adapted to be placed in the path of the exhaust gases while the venturi 13 is positioned between the intake manifold 14 and the combustion cylinder 15 so to be impinged by the charge as it passes into the cylinder. It will be noted that the venturi 13 is positioned as before set forth, that is, between the engine block and the intake manifold so that the charge after coming into contact with the venturi 13 and being heated thereby will have only the minimum distance to travel before being "fired" and contact with the cold walls of the intake manifold obviated. This plate 10 being placed between the engine block and the intake manifold, to insulate the same from the iron of the cylinders and intake manifold, asbestos gaskets 16 are provided. With this arrangement the plate 10 becoming heated because of the exhaust gases and flame sweeping through the venturi 12, retains a heated condition and the intake venturi 13 being a portion thereof provides a means for heating the charge as it passes into the explosion cylinder.

The intake venturi 13 has a plurality of apertures 17, formed therein, the same being positioned adjacent the annular recess 18 in the intake manifold 14. This recess 18 traps the raw fuel that flows on the inside of the intake manifold wall and because of the contact of the fuel with the heated plate the same becomes vaporized and then passes through the openings 17 into the cylinder. A series of fan like baffle blades 19 are secured in the throat of the venturi 13 to provide a contact member for the main stream of the charge. By means of this fan like baffle arrangement the main flow of the charge is directed against the walls of the venturi 13 and because of the heated condition of the same any raw fuel therein will be vaporized.

With the device above described the likelihood of raw fuel being fed to the explosion cylinder is reduced to the minimum. It will be observed that means is provided to vaporize not only the raw fuel in the main stream of the charge but also to trap and by means of contact with a heated surface vaporize that portion of the raw fuel which usually finds its way into the cylinder by flowing on the inner face of the wall of the intake manifold.

What is claimed is:

1. A charge vaporizing device for internal combustion engines including a strip of heat conducting material having spaced venturii formed therein, certain of said venturii adapted to be in contact with the exhaust gases of the engine and other of said venturii to be in contact with the intake charge of the engine.

2. A charge vaporizing device for internal combustion engines including a strip of heat conducting material having intake and exhaust venturii therein, and a baffle comprising a plurality of blades, adjacent the intake venturi, said blades so positioned as to direct the intake charge against the wall of the intake venturi.

3. In combination with the intake manifold having an annular recess formed in the inner face of the wall thereof at the end adjacent the engine block, of an annular member of heat conducting material mounted in the intake manifold adjacent the recess portion of the manifold forming a pocket to receive condensed particles of fuel from the fuel stream and means in said annular member to permit communication between the pocket and the bore of the annular member.

4. In combination with the intake manifold having an annular recess formed in the inner face of the wall thereof at the end adjacent the engine block, of an annular member of heat conducting material mounted in the intake manifold adjacent the recess portion of the manifold forming a pocket to receive condensed particles of fuel from the fuel stream, and a plurality of spaced apertures in the annular member permitting communication between the pocket and the bore of the annular member.

In testimony whereof I affix my signature.

EDWARD T. JONES,
*Administrator of the Estate of Walter W. Stryker, deceased.*